May 1, 1934. F. J. VOGEL 1,957,306
IMPULSE VOLTAGE TESTING OF ELECTRICAL APPARATUS
Filed Jan. 6, 1933   2 Sheets-Sheet 1

WITNESSES:

INVENTOR
Fred J. Vogel.
BY
ATTORNEY

May 1, 1934.   F. J. VOGEL   1,957,306
IMPULSE VOLTAGE TESTING OF ELECTRICAL APPARATUS
Filed Jan. 6, 1933   2 Sheets-Sheet 2

WITNESSES:
Leon J. Jaza
Wm. C. Groome

INVENTOR
Fred J. Vogel.
BY
Franklin E. Hardy
ATTORNEY

Patented May 1, 1934

1,957,306

UNITED STATES PATENT OFFICE 1,957,306

IMPULSE VOLTAGE TESTING OF ELECTRICAL APPARATUS

Fred J. Vogel, Sharon, Pa., assignor to Westinghouse Electric & Manufacturing Company, East Pittsburgh, Pa., a corporation of Pennsylvania Application January 6, 1933, Serial No. 650,416

13 Claims. (Cl. 175—183)

My invention relates to a method of and means for testing electrical apparatus, and particularly to testing the impulse voltage strength of the insulation employed in such apparatus.

The insulation of electrical apparatus, such as transformers, is continually subjected to a normal operating voltage at a frequency corresponding to the established frequency of the power system to which it is connected; usually 60 cycles or 25 cycles per second. In addition to the normal operating voltage of the system, surges may be caused on the line by switching operations on the system or by lightning disturbances. The impulse voltage strength of the insulation is its ability to withstand these surges.

The insulation tests specified by the standards of the American Institute of Electrical Engineers are either induced or applied over-potential tests at frequencies ranging from the normal frequency of the apparatus to perhaps 400 or 500 cycles per second.

The present standard tests for such electrical apparatus as transformer windings are inadequate because they provide only a uniform stress between turns throughout the winding which is not the case upon the occurrence of a voltage impulse or surge, as is clearly shown in Figure 1 of the drawings.

If lightning surges strike and damage a transformer in actual service, the fact is only known from the obvious effects of the flow of dynamic current from the power line into the fault produced by the lightning surge. In order that a transformer may withstand such conditions in actual service, it is necessary that the transformer insulation be sufficient to withstand the effect of the voltage impulse when the transformer is operating at a normal voltage. The worst condition that can occur in service is that the lightning surge occur at the same instant that the wave of dynamic voltage is at its crest, for at this instant the maximum dynamic voltage is available to cause the flow of dynamic current into any fault caused by the surge. In testing transformers for impulse voltage strength in accordance with the present invention, the worst condition of service just referred to is reproduced. That is, the impulse is impressed upon the transformer while it is excited at normal voltage, as in service, and at substantially the peak of the normal voltage wave.

It has been found that turn-to-turn and coil-to-coil impulse voltage failures in the transformer winding causing failure in service can be located if the transformer is excited and the surge impulse synchronized with the front or crest of the normal voltage wave. In order to carry out such a test, it was necessary, first, to develop means for synchronizing the discharge of the surge generator with the crest of the normal voltage wave and, second, to find some means of protecting the surge generator against the dynamic voltage impressed on the transformer.

In order to discharge the surge generator at the right moment, a tripping condenser is employed, together with a tripping transformer that is connected to the normal voltage source used to excite the transformer during tests. The tripping condenser is given a direct current charge and is connected in series with the alternating current voltage from the tripping transformer. The sum of the voltages from the condenser and the tripping transformer are unidirectional but pulsating in magnitude at normal frequency, and this voltage is impressed across a small sphere gap, that is adjusted to flash-over when the unidirectional voltage reaches its maximum value, which occurs at the crest of the alternating current voltage wave. The flash-over of this sphere gap causes the discharge of the entire surge generator, thus impressing the surge on the transformer under test as the exciting voltage wave reaches its crest.

This voltage, if connected directly to the surge generator, would in a few cycles burn up the load resistance through which the surge generator discharges. A particularly designed gap or modified Torok tube is connected between the transformer and the surge generator and functions to connect the surge generator and transformer together at the moment the generator discharges its impulse voltage and then disconnect the surge generator and transformer at the first passage of the dynamic current wave through its zero value.

The flashover of the bushing, while the transformer is excited at normal voltage, subjects the transformer windings to the mechanical stresses caused by short-circuit current. Under such conditions, the test combines the most severe dielectric tests which can occur in service due to lightning with the mechanical forces incident to short-circuit. Where the power supply used for exciting the transformer is large compared to the transformer rating, heavy short-circuit current will flow producing correspondingly great mechanical forces. Obviously, a transformer capable of withstanding tests of this character should be amply able to withstand the most severe conditions occurring in service.

It is, therefore, an object of my invention to provide a method of and means for testing the impulse strength of insulation applied to electrical apparatus.

A further object of my invention is the provision of means for applying impulse voltage tests to electrical apparatus under conditions similar to those existing when the apparatus is in service, and for determining the failure of the electrical apparatus when so tested.

A further object of my invention is the provision of means for applying surge potentials and system frequency potentials simultaneously at substantially the crest of the frequency potential wave.

A further object of my invention is the provision of means for protecting the surge generator from the normal frequency dynamic power impressed on the transformer during impulse testing.

Referring to the drawings, Figure 1 is a curve showing the initial distribution of an impulse voltage along the winding in an ordinary power transformer.

Figure 1:
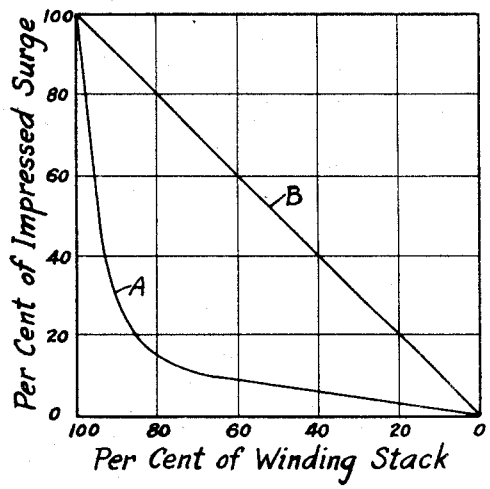
Figure 2:
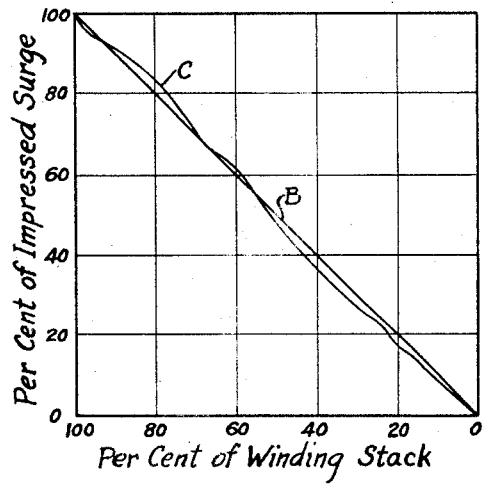
Fig. 2 is a curve illustrating the distribution of the initial impulse voltage in a power transformer of special design.

Referring to Fig. 1, it will be seen from the curve A that the initial distribution of a surge along the usual type of winding is such as to impress a very large proportion of the total surge voltage on a relatively small portion of the high-voltage end of the winding, thus making the voltage per turn very high on this part of the winding. For example, about 70% of the impressed surge voltage occurs across about 10% of the winding stack. The straight line B in Figs. 1 and 2 represent the even or normal frequency distribution of voltage along the winding. In order to guard against the effect of impulse surges in transformer windings, it has been proposed to increase the turn-to-turn insulation in order to provide the increased dielectric strength between turns. It has also been proposed to provide specially designed transformers of such electrical characteristics that the initial surge voltage will be distributed substantially evenly along the winding, as illustrated, for example, by the curve C in Fig. 2. Neither the provision of increased turn-to-turn insulation nor the improvement of the surge voltage distribution along the winding is, however, a complete solution to the problem and only an impulse voltage test provides the means for proving the adequacy of any winding construction.

Figure 3:
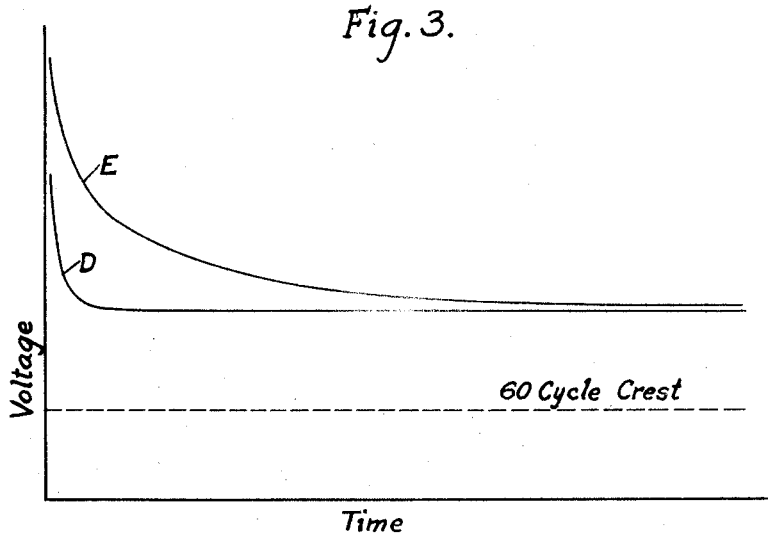
Fig. 3 illustrates a curve showing the comparison of the impulse voltage and the lag curves of two insulating materials under oil, which materials have the same breakdown strength at 60 cycles.

Another reason for the necessity of making impulse tests to prove the correct insulating strength of the winding may be observed by referring to Fig. 3, in which the curves D and E are comparative impulse voltage time lag curves for insulation in oil having the same 60 cycle breakdown strength. It will be noted that the impulse strength of the insulation to ground in these two cases is widely different. It will, therefore, be appreciated that the conventional induced voltage tests do not indicate the impulse strength of transformer windings to ground even where the windings are designed to have a substantially uniform surge voltage distribution, due to the variation in the shape of the time lag curves.

Figure 4:
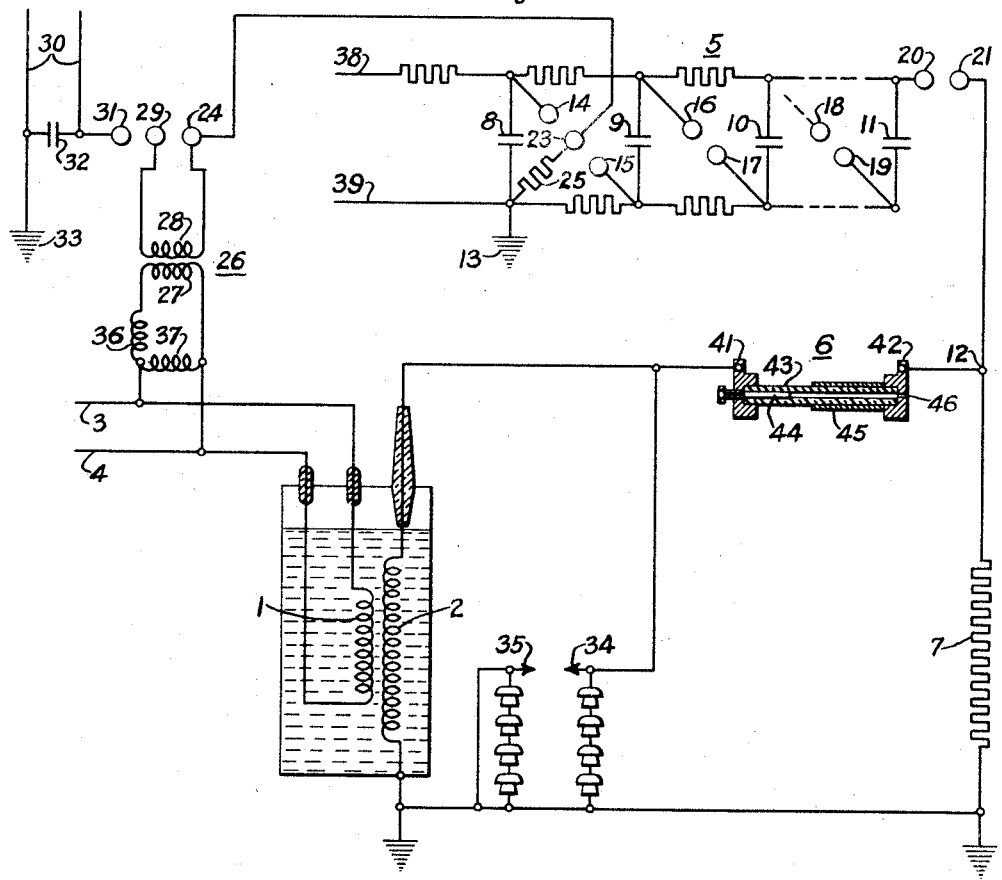
Fig. 4 is a diagram of connections illustrating the testing apparatus employed for synchronizing the surge with a point on the exciting voltage wave and the location of the protective gaps; and, Fig. 5 is a view in cross-section of the modified Torok tube or gap for protecting the surge generator.

Referring to Fig. 4, the windings 1 and 2 represent the low and high voltage windings, respectively, of a transformer under test. The primary winding is connected to a source of alternating current supply represented by conductors 3 and 4 and the high voltage winding 2 is connected to a surge generator indicated generally at 5, through a protective gap 6. A resistor 7 is illustrated as connected between the high voltage terminal 12 of the surge generator and ground, in parallel with the transformer winding 2. The opposite terminal of the surge generator is connected to ground at 13. The surge generator comprises a number of condensers 8, 9, 10 and 11 that are connected to discharge in series across sphere gaps 14 to 21, inclusive. A sphere 23 is positioned between the spheres 14 and 15 for the purpose of discharging the surge generator, and is connected to the sphere 24 and to ground through the resistor 25. A tripping transformer 26 is provided having a primary winding 27 that is energized from the alternating current conductors 3, 4 that also energizes the transformer under test, and with a secondary winding 28, the opposite terminals of which are connected to impress a voltage across the gap between the spheres 29 and 24. An induction regulator having series and shunt windings 36 and 37, respectively, may be provided between the transformer 26 and the supply conductors 3, 4, to control the voltage applied between the spheres 29 and 24. A tripping condenser 32 is connected between a sphere 31 and ground 33 and may be charged from a suitable source 30. If a positive surge is required from the generator 5, a negative voltage is required from the condenser 32. The sphere gap 14 to 23 is so set that the voltage of the condenser 8 is not quite sufficient to cause breakdown of the gap. The gap 15—23 is set to breakdown at a lower voltage than the gap 14—23. A small negative voltage from the tripping condenser 32 applied to the sphere gap 23 trips gaps 14 to 23 and 23 to 15 in succession and simultaneously the remaining gaps 16—17, 18—19, and 20—21, thus discharging the surge generator. The arrangement of the gaps 31—29 and 29—24 with respect to the tripping transformer 26, ensures synchronizing the discharge of the surge generator with the alternating current voltage. The gap 29—24 is set at a value just sufficient to withstand the normal alternating current voltage and the gap 31—29 is so set that it will break down only at a voltage value corresponding substantially to the crest of the alternating current voltage wave. The surge generator is, therefore, discharged at this point of the wave. The surge generator may be charged from any suitable source such as the conductors 38 and 39.

Figure 5:
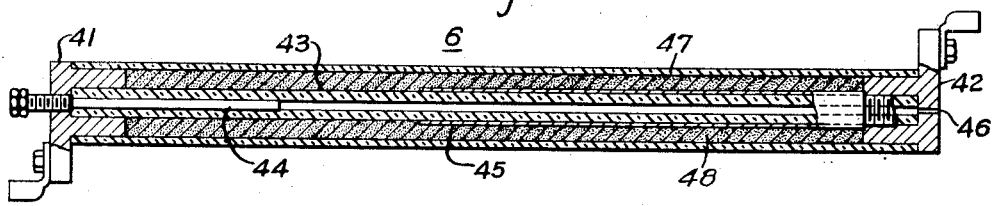

In the arrangement of the apparatus illustrated in Fig. 4, a resistor 7 is required to adjust the duration of the surge applied by the surge generator. The size of this resistor is such that if the voltage of the high-voltage winding 2 of the transformer under test were impressed upon it for more than a few cycles, a large power loss would result and burn up the resistor. In order to prevent this power-loss current form flowing, a gap 6, as shown in detail in Fig. 5, is connected between the winding 2 and the surge generator 5. The tube is provided with terminals 41 and 42 between which extend a hollow tube 43 of fibre. Within the tube a metallic rod 44 extends from the terminal 41 a suitable distance, and a conductor 45 that is connected to the terminal 42 surrounds the outer surface of the tube 43 for a suitable distance. The terminal 42 is provided with an opening 46 that permits the interior of the tube 43 to communicate with the external air. The terminals 41 and 42 may be rigidly held in proper spaced relation by a supporting and protective tube of insulating material 47. The space between the tubes 43 and 47 is filled with petrolatum 48 or other insulating compound, to prevent any electrical discharge except that inside the tube 43. The gap in the tube 6 is set sufficiently high to prevent the flow of alternating current from the transformer winding 2 through the resistor 7 or the surge generator 5 but will permit the flow of the surge current from the surge generator 5. Thus, upon the discharge of the surge generator, the surge voltage is impressed upon the transformer winding 2 and the flow of dynamic current from the winding is interrupted by the tube 6 as the alternating current wave passes through its first zero value following the discharge of the surge generator.

In making impulse voltage tests, the present voltage standard is the point gap. Such a gap is indicated at 34—35. In performing such tests the point gap is flashed over, resulting in the flow of power from the transformer under test. It has been desirable to provide a resistor, a lightning arrester, or a combination of condenser and resistor between the gap 35 and ground. This permits the flashover of the gap, but prevents the loss of voltage caused by short circuit conditions, and thereby maintains the severity of the dielectric test. In actual testing, tests are made with the gap 35 directly connected to ground for voltage measurement, and then with one of the additional devices above described.

Many modifications of the apparatus illustrated may be made within the spirit of my invention, and I do not wish to be limited other than by the scope of the appended claims.

I claim as my invention:

1. The method of testing the impulse-voltage strength of insulating material which consists in applying an alternating voltage from a source of dynamic power across the insulating material and in applying a voltage surge across said insulating material when the alternating voltage is at substantially its maximum value.

2. The method of testing the impulse-voltage strength of insulating material which consists in applying a dynamic alternating voltage of commercial frequency across the insulating material and in applying a voltage surge across the insulating material at a predetermined point on the dynamic voltage wave.

3. The method of testing the impulse-voltage strength of an electrical winding which consists in applying thereto an alternating dynamic voltage of normal value and frequency to the winding and in applying a voltage surge to the winding at a predetermined point on the dynamic voltage wave.

4. The method of testing the impulse-voltage strength of an electrical winding which consists in exciting said winding from a source of dynamic power with an alternating voltage of normal voltage value and frequency and in impressing a surge voltage across said winding substantially as the exciting voltage wave reaches its crest.

5. Apparatus for testing the impulse strength of an electrical winding comprising a dynamic alternating voltage power source connected to said apparatus, and means for applying a surge voltage to said apparatus at substantially the crest of the alternating voltage wave.

6. Apparatus for testing the impulse-voltage strength of an electrical winding comprising a dynamic power source of alternating current connected to said apparatus, a surge generator connected to said apparatus, and means for discharging the surge generator to impress a voltage surge on the apparatus at substantially the instant that the alternating voltage wave reaches its crest value.

7. Apparatus for testing the impulse-voltage strength of an electrical winding comprising a dynamic power source of alternating voltage connected to energize said winding, a surge generator connected to said apparatus, means for discharging the surge generator to impress a voltage surge on the winding at substantially the instant that the alternating voltage wave reaches a predetermined value, and means for preventing the flow of current from said source of dynamic voltage to said surge generator.

8. Apparatus for testing the impulse-voltage strength of an electrical winding comprising a dynamic power source of alternating current connected to said apparatus, a surge generator connected to energize said winding, means for discharging the surge generator to impress a voltage surge on the winding at a predetermined point on the alternating voltage wave, and means for disconnecting the surge generator from the apparatus at the first zero point of the alternating current following the discharge of the surge generator.

9. Apparatus for testing the impulse strength of electrical insulating material comprising a dynamic alternating voltage power source connected to said apparatus, and means for applying a surge voltage to said apparatus substantially at a predetermined point on the alternating voltage wave.

10. Apparatus for testing the impulse strength of an electrical winding comprising a dynamic alternating voltage power source connected to said apparatus, a surge generator for applying a surge voltage to said apparatus, and means for discharging said surge generator at a predetermined point on the alternating voltage wave comprising two gaps in series, means for applying voltage from said alternating voltage power source across one of said gaps, said gap being set high enough to withstand only said alternating voltage, a tripping condenser connected to one side of the other gap, said gap being so set as to break down at a predetermined value of said alternating voltage.

11. Apparatus for testing the impulse strength of an electrical winding comprising a dynamic alternating voltage power source connected to said apparatus, a surge generator for applying a surge voltage to said apparatus, and means for discharging said surge generator at a predetermined point on the alternating voltage wave comprising three elements arranged to form two gaps in series, one of said end elements being connected to discharge said surge generator, means for applying voltage from said alternating voltage wave between said end element and the middle element, the gap between these elements being set just high enough to withstand said alternating voltage, and a tripping condenser connected between the other end element and ground, the gap between this end element and the middle element being so set that it will just break down at a predetermined value of said alternating voltage wave.

12. Apparatus for testing the impulse-voltage strength of an electrical winding having one end connected to ground comprising a dynamic power source of alternating current connected to said apparatus, a surge generator, a discharge resistor connected between said surge generator and ground, means for connecting the ungrounded end of said electrical winding to said surge generator at a point between said generator and said discharge resistor, means for discharging the surge generator to impress a voltage surge on the electrical winding at a predetermined point on the alternating voltage wave, and means for disconnecting the winding from said surge generator and from said discharge resistor at the first zero point of the alternating current following the discharge of the surge generator.

13. Apparatus for testing the impulse-voltage strength of an electrical winding comprising a dynamic power source of alternating voltage connected to energize said winding, a surge generator, a discharge resistor, said electrical winding, surge generator, and discharge resistor each being connected to ground at one end, the ungrounded ends thereof being connected to a common point, means for discharging the surge generator to impress a voltage surge on the electrical winding at substantially the instant that the alternating voltage wave reaches a predetermined value, and means for preventing the flow of current from said source of dynamic voltage to said surge generator and to said discharge resistor.

FRED J. VOGEL.